US00RE36712E

United States Patent [19]

Sato et al.

[11] E Patent Number: Re. 36,712

[45] Reissued Date of Patent: May 23, 2000

[54] RADIO TELEPHONE APPARATUS

[75] Inventors: Hiroshi Sato; Makoto Hoshimo; Takaaki Ishii, all of Tokyo, Japan

[73] Assignee: Kabushiki Kaisha Toshiba, Kawasaki, Japan

[21] Appl. No.: 08/972,715

[22] Filed: Nov. 18, 1997

Related U.S. Patent Documents

Reissue of:

[64] Patent No.: 4,933,963
Issued: Jun. 12, 1990
Appl. No.: 07/275,187
Filed: Nov. 23, 1988

U.S. Applications:

[63] Continuation of application No. 08/281,678, Jun. 10, 1990, which is a continuation of application No. 07/894,625, Jun. 5, 1992, abandoned.

[30] Foreign Application Priority Data

Nov. 30, 1987 [JP] Japan ..... 62-301836

[51] Int. Cl.[7] ..... H04Q 7/32

[52] U.S. Cl. ..... 455/550; 455/574; 455/572; 455/404; 455/411

[58] Field of Search ..... 455/550, 574, 455/572, 127, 404, 411, 73, 462, 38.3; 331/57

[56] References Cited

U.S. PATENT DOCUMENTS

| | | | |
|---|---|---|---|
| 3,500,458 | 3/1970 | Cannalte | 455/127 |
| 3,500,459 | 3/1970 | Battin et al. | 455/78 |
| 3,644,681 | 2/1972 | Rice . | |
| 4,053,717 | 10/1977 | Snider . | |
| 4,449,248 | 5/1984 | Leslie et al. | 455/38.3 |
| 4,467,140 | 8/1984 | Fathauer et al. . | |
| 4,471,492 | 9/1984 | Mann et al. | 455/127 |
| 4,495,649 | 1/1985 | Iwata . | |
| 4,509,201 | 4/1985 | Sekigawa et al. | 455/73 |
| 4,521,912 | 6/1985 | Franke et al. | 455/115 |
| 4,731,814 | 3/1988 | Becker et al. | 379/62 |
| 4,736,461 | 4/1988 | Kawasaki et al. | 455/343 |
| 4,745,408 | 5/1988 | Nagata et al. | 340/825.44 |
| 4,821,309 | 4/1989 | Namekawa | 379/58 |
| 4,852,147 | 7/1989 | Suzuki et al. | 379/58 |
| 4,893,348 | 1/1990 | Andoh | 455/89 |
| 4,903,319 | 2/1990 | Kasai et al. | 455/33 |

FOREIGN PATENT DOCUMENTS

| | | | |
|---|---|---|---|
| 0218482 | 4/1987 | European Pat. Off. | 379/58 |
| 0330514 | 8/1989 | European Pat. Off. | 455/127 |
| 0159131 | 10/1982 | Japan | 455/127 |
| 0212829 | 12/1982 | Japan | 455/127 |
| 0070833 | 4/1985 | Japan | 379/58 |
| 0116027 | 5/1987 | Japan | 379/58 |

*Primary Examiner*—William Cumming
*Attorney, Agent, or Firm*—Banner & Witcoff, Ltd.

[57] ABSTRACT

A radio telephone apparatus power-supplied with a battery comprises a power supply control [means] for controlling the battery so as to terminate power supply if the apparatus is not operated for a predetermined time period. The apparatus further comprises [means] *an alerting device* for informing [at least] a user of the termination of power supply prior to the power being turned off.

20 Claims, 7 Drawing Sheets

RADIO TELEPHONE APPARATUS

Matter enclosed in heavy brackets [ ] appears in the original patent but forms no part of this reissue specification; matter printed in italics indicates the additions made by reissue.

*This application is a continuation of application Ser. No. 08/281,678, filed Jun. 10, 1990; which is a continuation of Ser. No. 07/894,625, filed Jun. 5, 1992, now abandoned.*

FIELD OF THE INVENTION

The present invention relates to the field of radio telephone apparatus such as mobile telephones, portable telephones, cordless telephones, or the like and more specifically to radio telephones in which power is supplied with a battery.

BACKGROUND OF THE INVENTION

Recently various kinds of radio telephone have been developed. One of these is generally referred to as a mobile telephone. The mobile radio telephone, which may be mounted in a car, a train, a ship or the like, comprises a transceiver unit with an antenna and telephone unit including a handset and a base unit. These units are physically separated and are connected by signal lines to one other.

Another kind of radio telephone is referred to as a portable telephone. Portable telephones may be further divided into two groups: a transportable type and a handheld type. In the transportable type of portable radio telephone, a transceiver unit is combined into a main unit of a telephone unit and an antenna is attached to the main unit; consequently a user may carry the transportable telephone wherever the user goes. In the handheld type of portable radio telephone, all components are compacted into one unit which may be held in the hand of a user. All of these radio telephones are supplied power from a battery. Differentiated from the kinds of radio telephone mentioned above, there is yet a further kind of radio telephone, namely a cordless telephone. The cordless telephone has one or more base units connected to one or more land lines and one or more handheld units. The handheld unit communicates with another telephone apparatus by first establishing a radio channel with the base unit. The handheld unit of a cordless telephone is also supplied power with a battery.

Generally, it is required to reduce consumption of electric power in a radio telephone since a battery installed therein or in a vehicle has a limited power capacity.

In the case of a mobile telephone in a car, a battery mounted in the car is rechargeable as long as the car runs. However when the car ignition is turned off and the car is parked the user may leave the mobile telephone turned on by entering a certain command on the key pad. In such a situation, the mobile telephone consumes the power of the battery wastefully. The power consumption may drain the battery to the extent that the car will not start.

Another problem unsolved by prior art mobile telephone apparatus is introduced when the automobile is removed from the serving area of the mobile telephone service provider. In such a situation, the apparatus may continue to drain battery energy even though the mobile telephone apparatus may be useless.

In the case of either a portable telephone or a hand-held unit of cordless telephone, the consumption of battery power is a more serious problem because these have only a limited power capacity.

SUMMARY OF THE INVENTION

It is accordingly an object of the present invention to provide an improved radio telephone apparatus capable of conserving battery power.

It is a further object of the present invention to provide an improved radio telephone apparatus in which power supply is automatically cut off if a user does not operate it for a predetermined time period.

It is still a further object of the present invention to provide an improved radio telephone apparatus in which a user may be informed that power supply will be cut off to conserve battery power.

To achieve one or more of the objects, as embodied and described herein, the invention comprises transmitting means for transmitting signals over a first radio channel; receiving means for receiving signals sent over a second radio channel; input means responsive to a user's actuation for inputting data associated with the operation of said transmitting means and said receiving means; power supply means for supplying said transmitting means and said receiving means with electric power; signal generating means responsive to the input at said input means for generating a flag signal; detecting means for detecting the presence or the absence of the flag signal within predetermined time interval; counting means for counting how many times said detecting means detects the absence of the flag signal continuously; alarming means for alarming at least one user of the apparatus when a count value counted by said counting means exceeds a first predetermined value.

Additionally, to achieve one or more of the objects, as embodied and described herein, the invention comprises transmitting means for transmitting signals over a first radio channel; receiving means for receiving signals sent over a second radio channel; input means responsive to an user's operation for inputting data; control means for controlling said transmitting means and said receiving means in response to the data input by said input means; power supply means for supplying said transmitting means, said receiving means, said input means, and said control means with electric power; time measuring means for measuring time passage from the time when said input means is operated lastly; and alarming means for alarming at least one user of the apparatus in response to the passage of time measured by said measuring means exceeding a first predetermined time period.

Furthermore to achieve one or more of the objects, as embodied and described herein, the invention comprises transmitting means for transmitting signals over a first radio channel;

receiving means for receiving signals transmitted over a second radio channel; input means responsive to a user's operation for inputting data associated with the operation of said transmitting means and said receiving means; power supply means for supplying said transmitting means, said receiving means, and said input means with power; power supply control means for controlling said power supply means so as to terminate the supply of power when a predetermined time period passes from the time when said input means is operated lastly.

The problems and related problems of prior art radio telephone apparatus are solved by the principles of the present invention. The user is warned of impending power turn-off to their radio telephone apparatus before power is turned off. Power is automatically turned off to the radio telephone apparatus whenever the telephone is idle for a predetermined period of time. The power is turned off in a two step process wherein the user is first warned after a period of non-usage of the telephone of the impending turning off of power. Then the power is finally turned off after a second predetermined time period. Furthermore, the present apparatus may be integrated into the structural components of an automobile, i.e., into the dashboard comprising visual and audible warning devices, and the automobile's warning control systems.

DETAILED DESCRIPTION

A preferred embodiment of the present invention, applied in a mobile telephone, will be described with reference to the accompanying drawings. The invention may be likewise applied in any other kind of radio telephone apparatus including but not limited to portable telephones or cordless telephones.

Figure 1:
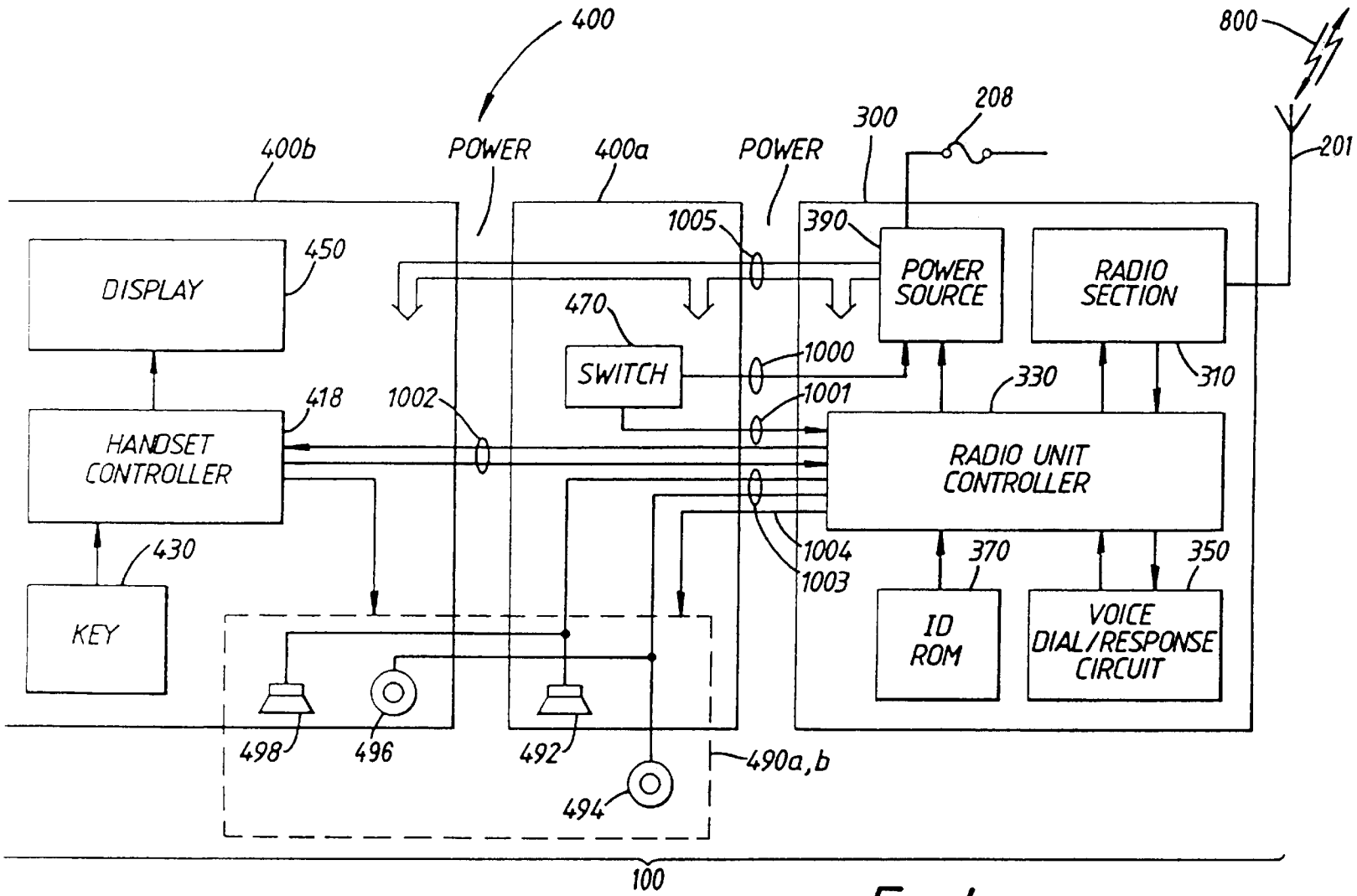
FIG. 1 is a block diagram showing an arrangement of a mobile telephone apparatus according to an embodiment of the present invention.

FIG. 1 is a block diagram showing an arrangement of a mobile telephone apparatus according to an embodiment of the present invention.

Figure 2:
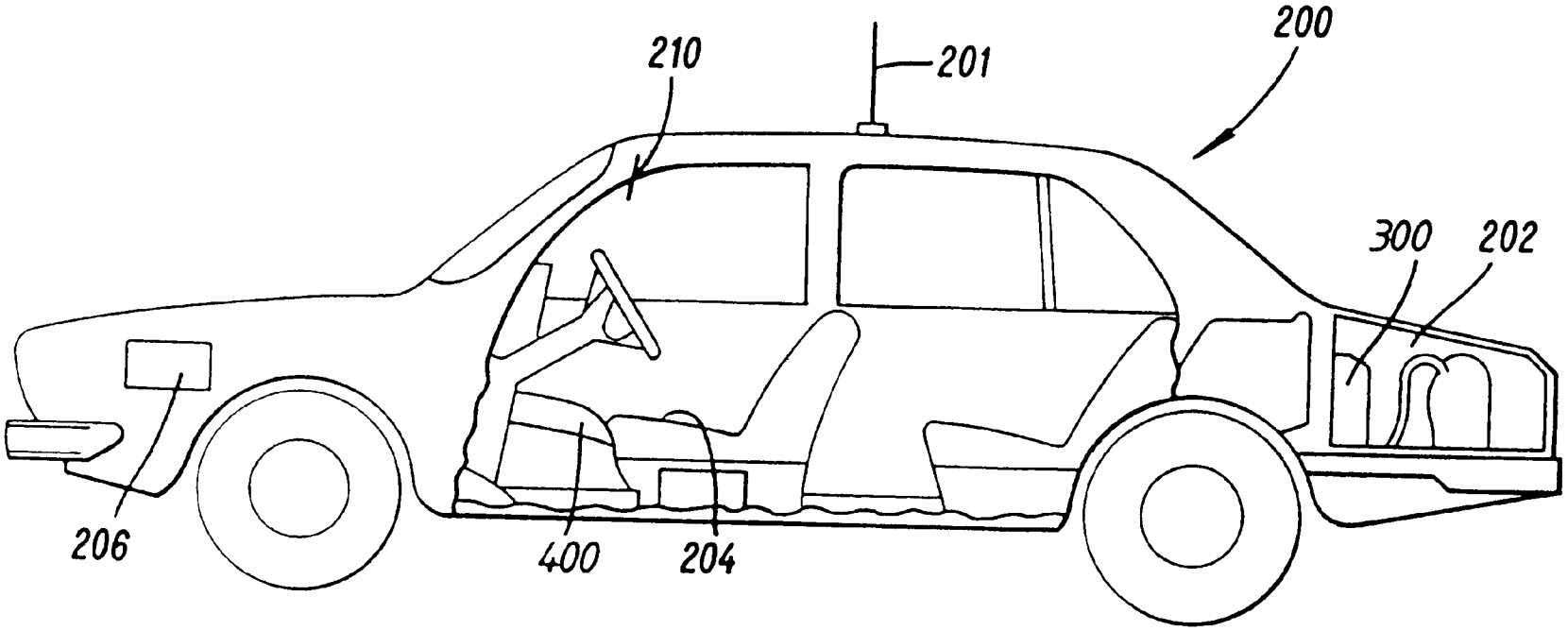
FIG. 2 is a cross-sectional view of an automobile showing the installation of mobile telephone apparatus therein.

Referring to FIG. 1, mobile telephone apparatus 100 comprises antenna 201, radio unit 300, and telephone unit 400. As shown in FIG. 2, antenna 201 is mounted on an outer body surface of automobile 200. Telephone unit 400 is mounted near driver's seat 204 inside automobile 200.

Radio unit 300 mainly comprises radio section 310 for establishing a first and a second radio channel 800 with a base station (not shown) through antenna 201 and for exchanging signals therewith, radio unit controller 330 for controlling the overall operations of the apparatus, voice dial/response circuit 350 for performing speech recognition and synthesis and for storing speech pattern signals, ID ROM 370 for storing ID (Identification Number) and telephone numbers, and power source 390 for supplying power from battery 206 (FIG. 2) mounted in the automobile to the above components through fuse 208.

Telephone unit 400 mainly comprises handset controller 418 for controlling the overall operations of telephone unit 400 in response to instructions or the like from radio unit controller 330, key unit 430 for entering key inputs, display unit 450 for displaying numerical or alphabetical characters in response to the control of handset controller 418, switches 470 for performing various switching operations, and selectable audio input/output units 490 a or b for inputting or outputting an audible sound. Telephone unit 400 may be divided into main unit 400a and handset 400b. Microphone 494 may be a hands-free microphone mounted on sun visor 210 or the like near driver's seat 204 and is connected to main unit 400a. Together, microphone 494 and speaker 492 comprise a hands-free handset 410a. Loud speaker 492 may be mounted in main unit 400a. Handset controller 418, key unit 430, and display unit 450 are mounted in handset 400b. Handset microphone 496 and handset receiver 498 constitute audio input/output unit 490b of handset 400b.

Each section of radio unit 300, main unit 400a, and handset 400b is supplied power by way of a power line 1005 extending from power source 390 in radio unit 300. The opened or closed status of switches 470 is transmitted to power source 390 or radio unit controller 330 by way of line 1000 or line 1001, respectively. Control or command signals are transmitted between handset controller 418 and radio unit controller 330 by way of line 1002. Audio signals are transmitted by way of lines 1003. Radio unit controller 330 sends control signals to audio input/output unit 490a, by way of lines 1004.

Figure 3:
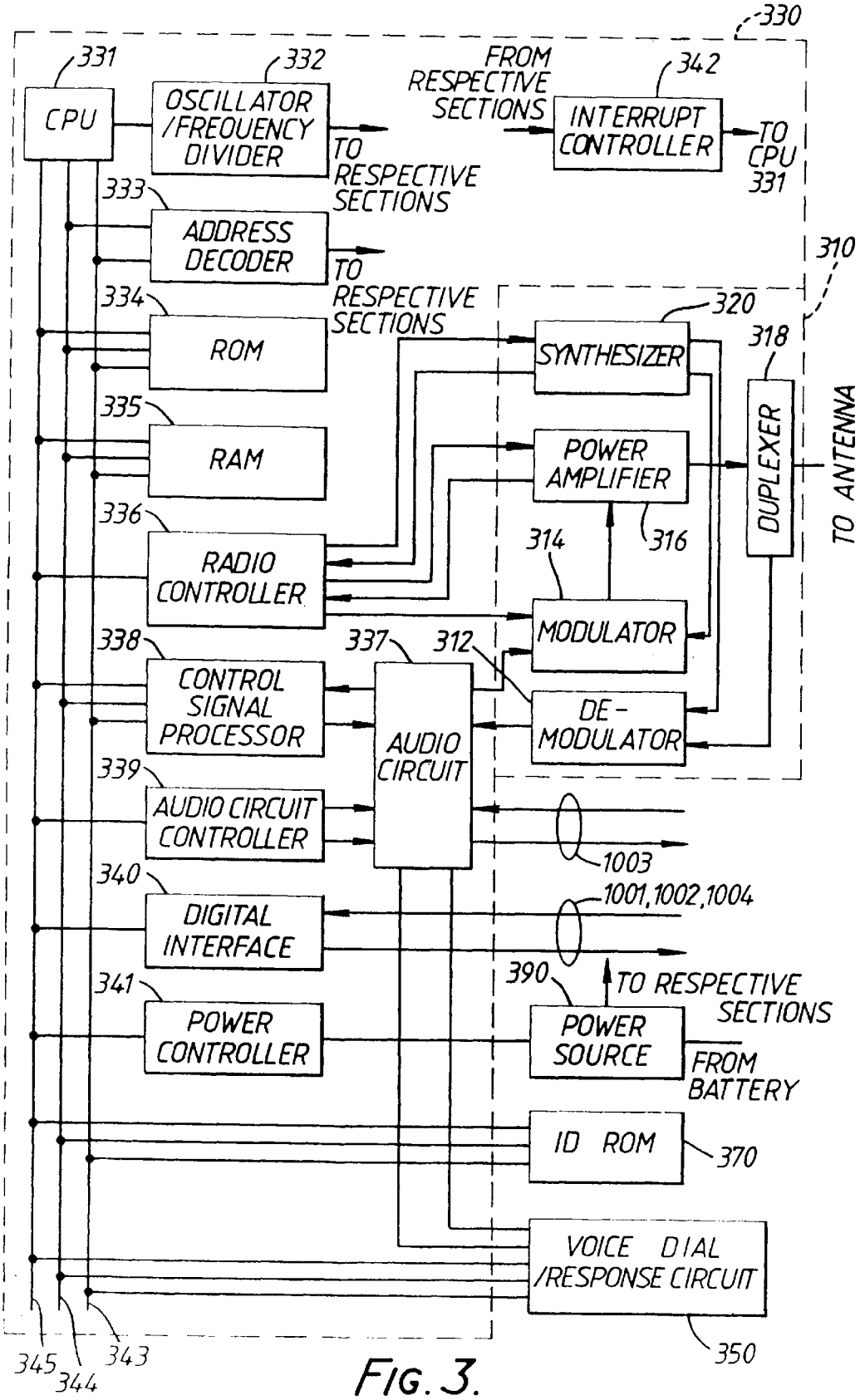
FIG. 3 is a block diagram of a radio unit in the mobile telephone apparatus.

FIG. 3 is a block diagram showing a detailed arrangement of the radio unit of FIG. 1.

Referring to FIG. 3, radio section 310 comprises demodulator 312, modulator 314, power amplifier 316, and duplexer 318 and synthesizer 320. Demodulator 312 demodulates a radio signal received from the base station through radio channels 800, antenna 201, and duplexer 318. It should be noted that this signal includes audible sound signals and control signals. Modulator 314 modulates the audio and control signals and the like from audio controller 330 and generates transmission signals.

Power amplifier 316 amplifies the transmission signals from modulator 314. The amplification of power amplifier 316 is variable, e.g., 8-step variable. Duplexer 318 sends the signals received through radio channel 800 and antenna 201, to demodulator 312, and the signals from modulator 314 and power amplifier 316, to antenna 201. Synthesizer 320 comprises a channel selection local oscillator and specifies a frequency from which signals are demodulated by demodulator 312 and a frequency to which signals are modulated by modulator 314. About 666 channels are available for synthesizer 320.

Radio unit controller 330 comprises CPU 331, oscillator/frequency divider 332, address decoder 333, ROM 334, RAM 335, radio controller 336, audio circuit 337, control signal processor 338, audio controller 339, digital interface 340, power controller 341, and interrupt controller 342. Reference numeral 343 denotes a data bus; 344, an address bus; and 345, a control bus. CPU 331 controls the operations of radio unit controller 330. Oscillator/frequency divider 332 supplies clock signals to CPU 331 and divides the clock signals so as to supply appropriately frequency-divided pulses as timing pulses to each section of the mobile telephone apparatus requiring them. Address decoder 333 outputs predetermined operation signals to the components in response to instruction signals from CPU 331. ROM 334 stores various programs required for operations by CPU 331. RAM 335 stores various kinds of data during processing of CPU 331. Radio controller 336 controls radio section 310 in response to an instruction from CPU 331. For example, radio controller 336 sends signals indicative of available frequencies to the synthesizer 320, signals indicative of an amplification level to power amplifier 316, and signals indicative of modulation parameters to modulator 314. Radio controller 336 receives a step-out signal from synthesizer 320 and output power detection signals from power amplifier 316 and supplies them to CPU 331, thereby preventing operation errors. Audio circuit 337 extracts control signals and audio signals from the received signals demodulated by demodulator 312 and supplies the control signals to control signal processor 338 and the audio signals to voice dial/response circuit 350 and telephone unit 400. Audio circuit 337 also supplies, the control signals from control signal processor 338 and audio signals from telephone set 400 and voice dial/response circuit 350 to modulator 314. It should be noted that audio circuit 337 also arranges the signal form of the control signal to be sent to control signal processor 338 in a particular wave format and filters the control signal to be supplied to modulator 314. Control signal processor 338 acquires bit and frame synchronization with the control signal from audio circuit 337. Maintaining the acquired synchronization, control signal processor 338 converts the serial control signals including control data received from a base station into parallel signals and converts the parallel control data signals to be transmitted to a base station into serial signals the control signals are sent to and from the base station via audio circuit 337. Audio circuit controller 339 controls audio circuit 337. For example, under the control of audio circuit controller 339, audio circuit 337 selectively applies the received signals from demodulator 312 to control signal processor 338, to voice dial/response circuit 350, and to telephone unit 400 and selectively receives the signals from control signal processor 338, voice dial/response circuit 350, or telephone unit 400. Digital interface 340 interfaces data communication between radio unit 300 and telephone unit 400. Power controller 341 controls power source 390. For example, power controller 341 sets a voltage supplied from battery 206 to power source 390 to a predetermined level. The voltage having the predetermined level is supplied to the respective components. Interrupt controller 342 interrupts CPU 331 in response to an interrupt signal from each component.

Figure 4:
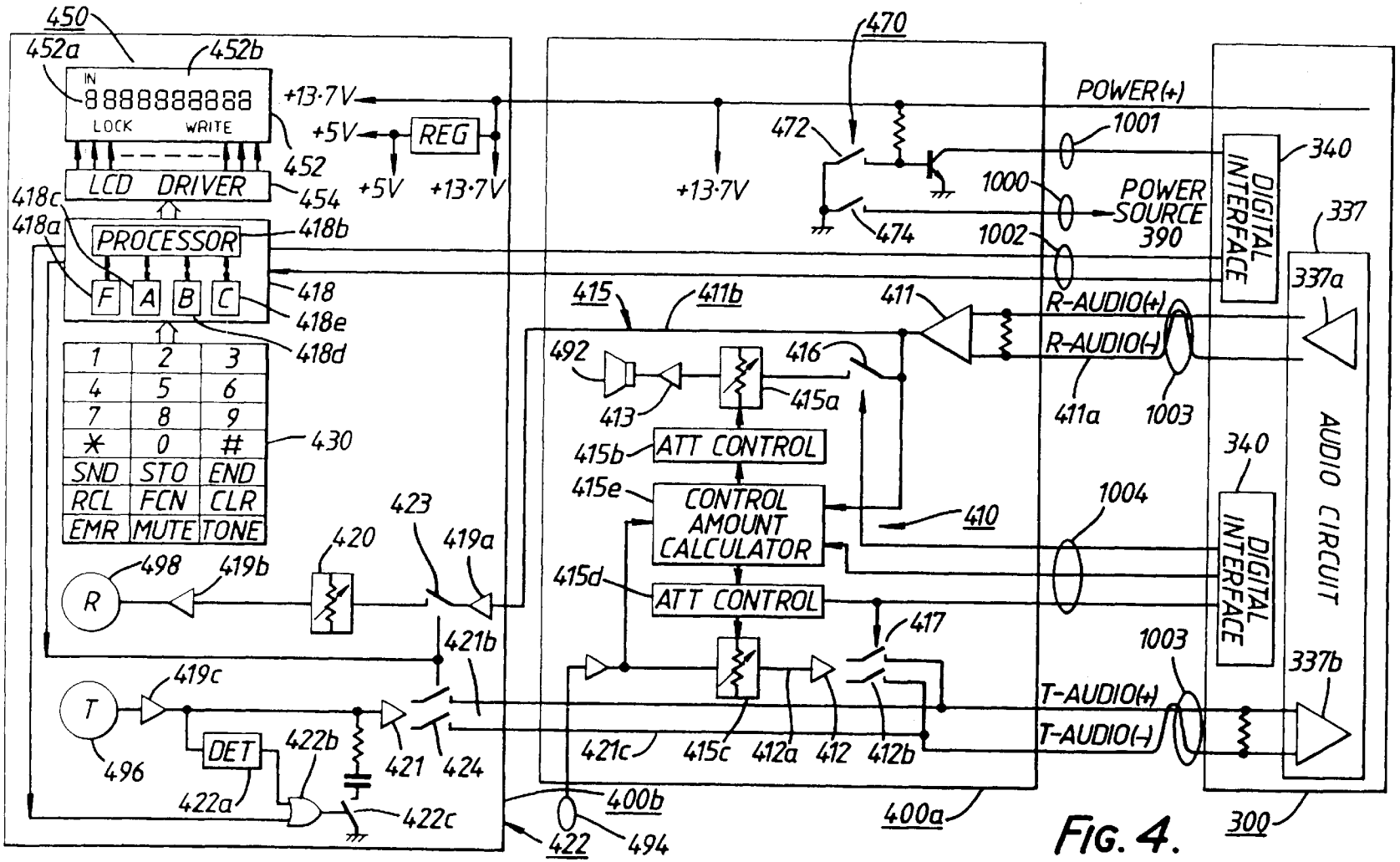
FIG. 4 is a circuit diagram of a telephone set.

FIG. 4 is a further detailed view of the telephone unit 400 described above.

Referring to FIG. 4, main unit 400a mainly comprises audio controller 410, speech input/output unit 490a, and switch unit 470. Audio controller 410 mainly comprises balanced-to-unbalanced (B/U) converter 411, unbalanced-to-balanced (U/B) converter 412, amplifiers 413 and 414, echo canceler 415, and switches 416 and 417. Speech input/output unit 490a comprises hands-free microphone 494 and loudspeaker 492. Switch unit 470 comprises hook switch 472 and on/off switch 474.

Balanced line to unbalanced line converter 411 converts the speech signals sent from audio circuit 337 in radio unit 300 through balanced line 411a into signals on unbalanced line 411b. The speech signals converted into the signals on unbalanced line 411b are amplified by amplifier 413 and output via loudspeaker 492. Since the speech signals output from the audio circuit in the radio unit are signals on an unbalanced line, the speech signals are converted into signals on the balanced line by U/B converter 337a arranged in an immediate output stage of the audio circuit 337. The speech signals input at hands-free microphone 494, amplified by amplifier 414, and appearing on unbalanced line 412a are converted into signals on balanced line 412b. The speech signals converted into the signals on balanced line 412b are sent to audio circuit 337 through balanced line 412b. The speech signal inputs to audio circuit 337 in radio unit 300 are signals on the unbalanced line, so that the speech signals ar converted into signals on the unbalanced line by B/U converter 337b arranged in the immediate input stage of audio circuit 337.

Echo canceller 415 comprises attenuator 415a for attenuating the speech signal input from B/U converter 411 to amplifier 413, attenuation controller 415b for controlling an attenuation rate of attenuator 415a, attenuator 415c for attenuating the speech signal input from the amplifier 414 to U/B converter 412, attenuation controller 415d for controlling an attenuation rate of attenuator 415c, and control amount calculator 415e for calculating control amounts of attenuation controllers 415b and 415d on the basis of the speech signal on the respective lines. Switch 416 is operated to select the speech signal from B/U converter 411 is to be output from loudspeaker 492. Switch 417 is operated to select the speech signal from hands-free microphone 494 is sent to audio circuit 337 in radio unit 300. The operation of switches 416 and 417 are performed on the basis of control signals output from radio unit controller 330. Hook switch 472 detects the on- or off-hook state of handset 400b. The detected signal is sent to radio unit controller 330 (FIG. 1) in radio unit 300 via digital interface 340. On/off switch 474 performs overall ON/OFF operation of mobile telephone apparatus 100. A switching signal from switch 474 is sent to radio unit controller 330 in radio unit 300 via digital interface 340.

Handset 400b comprises handset controller 418, display unit 450, key unit 430, and speech input/output unit 490b. Display unit 450 comprises liquid crystal display 452 and LCD driver 454. Key unit 430 comprises a plurality of keys which may be arranged in a key pad. Speech input/output unit 490b (not shown in FIG. 4) comprises amplifiers 419a, 419b, and 419c, an attenuator 420, U/B converter 421, speech switch unit 422, and switches 423 and 424, handset microphone 496, and handset receiver 498. Handset controller 418 controls the overall operations of handset 400b on the basis of control signals sent from radio unit controller 330 in radio unit 300. At the same time, handset controller 418 sends control signals or the like input from key unit 430 to radio unit controller 330 in radio unit 300 via digital interface 340. Amplifiers 419a and 419b amplify the speech signal sent from the B/U converter 411 in main unit 400a. Attenuator 420 attenuates the speech signals amplified by amplifiers 419a and 419b. The speech signal output through amplifier 419a, attenuator 420, and amplifier 419b is output from handset receiver 498. Amplifier 419c amplifies the speech signal input from handset microphone 496. U/B converter 421 converts the amplified speech signals on unbalanced line 421a into signals on balanced line 421b. The speech signal converted into the signal on balanced line 421b is sent to audio circuit 337 through balanced line 421b and balanced line 421c. Switch 423 is operated to select the speech signal from B/U converter 411 is to be output from handset receiver 498. Switch 424 is operated to select the speech signal from handset microphone 496 is to be output to audio circuit 337 in radio unit 300. The operation of switches 423 and 424 are performed on the basis of the control signal output from handset controller 418 and are interlocked with switches 416 and 417 in main unit 400a.

In a standby mode of mobile telephone apparatus 100, all switches 416, 417, 423 and 424 are turned off. In a sound generation mode for a key input, switch 416 is turned on, and switches 417, 423 and 424 are turned off. When handset 400b is used for communication in the off-hook state, switches 416 and 417 are turned on, and switches 423 and 424 are turned off. Speech switch unit 422 comprises level detector 422a, OR gate 422b, and switch 422c. Level detector 422a detects a signal level of speech signal input to handset microphone 496. If the signal level is less than a predetermined value, level detector 422a generates a signal of level "L". However, if the signal level exceeds the predetermined value, level detector 422a generates a signal of level "H". OR gate 422b receives an output signal L or H from level detector 422a and a predetermined control signal output from controller 418 and generates an output signal when either input is present. Switch 422c is turned on in response to the signal of level "L" from OR gate 422b, and speech signal line 421a is grounded. The speech signal from handset microphone 496 is not transmitted to audio circuit 337, and handset microphone 496 is set in the OFF state. Switch 422c is turned off in response to the signal of level "H" from the OR gate 422b, and the handset microphone 496 is set in the ON state. The control signal input from controller 418 to one input terminal of OR gate 422b is set at level "L" in the standby mode and during normal communication and at level "H" in the voice recognition mode allowing voice dialing. Therefore, when no voice is input to handset microphone 496 in the busy state, handset microphone 496 is set in the OFF state. Therefore, noise in the automobile 200 is not sent to the other party, thereby comfortable communication can be achieved.

Liquid crystal display 452 comprises a numerical display element 452a having several display digit positions and display element 452b for displaying various functions. LCD driver 454 drives liquid crystal display 452 under the control of handset controller 418 to display numerical or alphabetical characters. Key unit 430 includes keys including at least numerical keys "0" to "9" as well as function keys "*", "#", "SND", "STO", "END", "RCL", "FCN", "CLR", "EMR", "MUTE", and "TONE". When a desired key pad is depressed, the depressed key is detected by handset controller 418.

Next, the operation for power supply control in this embodiment will be described in detail with reference to FIG. 5.

Figure 5:
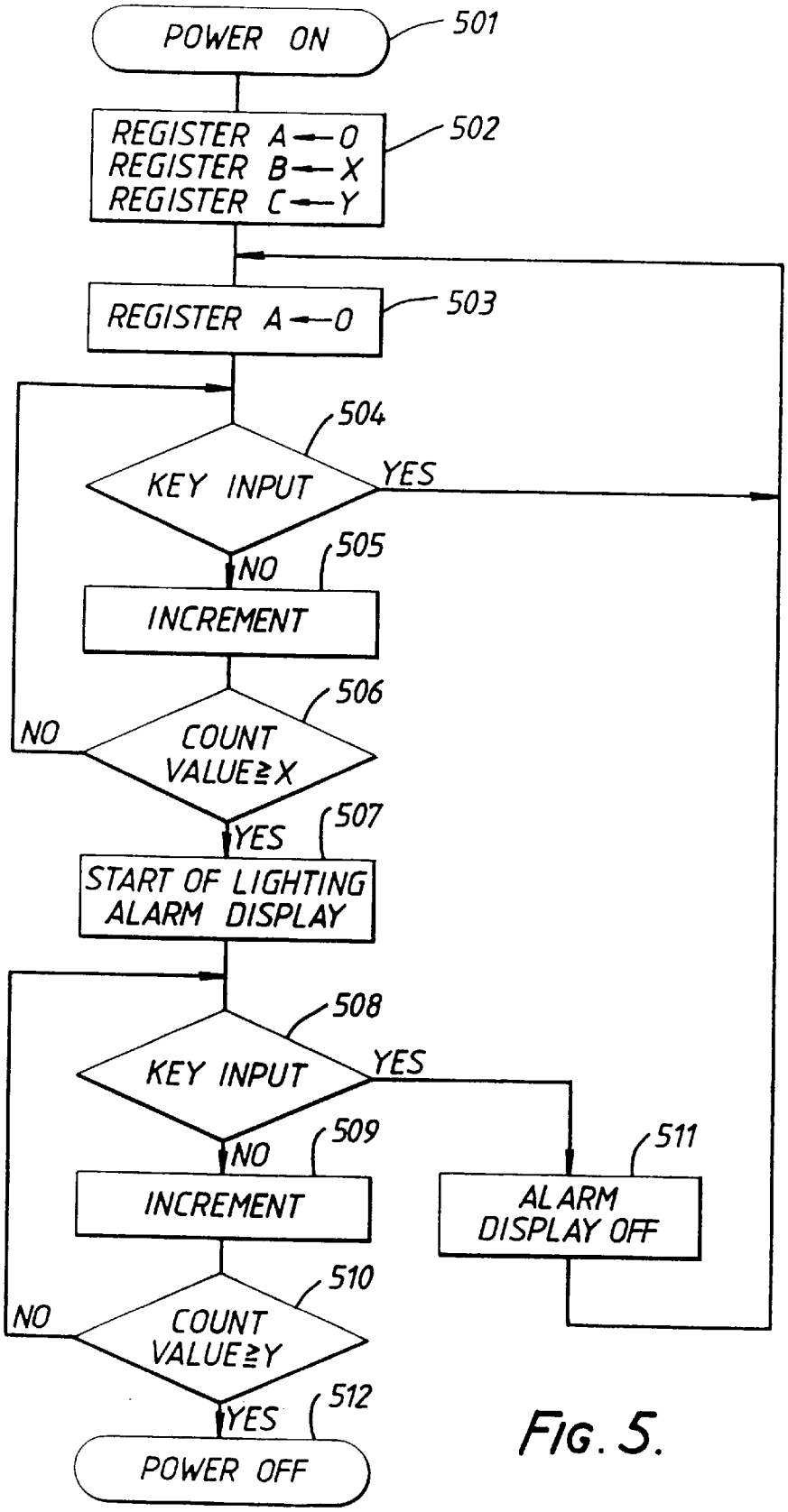
FIG. 5 is a flow chart of an algorithm showing the operation of power supply control according to a first embodiment.

Referring to FIG. 5, after on/off switch 474 in main unit 400a is turned on by a user (step 501), handset controller 418 in handset 400b determines whether any key is operated at key unit 430 within a first predetermined period: $t_1$ (steps 504, 506). Namely, if at least one key is operated, a flag indicative of key operation is set at a register 418a in handset controller 418. A processor 418b of controller 418 checks whether the flag is set or not (step 504). This check is made periodically, for example at 8msec intervals. In the case that at least one key is operated, handset controller 418 continues to perform the periodical check. On the other hand, in the case that the flag is not set when the flag register is checked the processor 418b of handset controller 418 increments a count value at a register A 418a in handset controller 418 (step 505). Thus, this count value, which is zero in an initial state (step 502), shows how many times the check was made continuously without detecting the flag being set and is stored in register A 418c. And, in step 506, it is determined whether the count value exceeds a first predetermined value: X, which is read from RAM 335 by CPU 331, transmitted via digital interface 340 and line 1002 to handset controller 418, and stored in register B 418d in advance (step 502). If the count value neither exceeds nor equals the first predetermined value X the operation of handset controller 418 returns to step 504. The above mentioned value counted by the processor 418b of controller 418 is reset to zero when the setting of the flag indicative of key operation is detected at step 504. If the count value exceeds or equals the first predetermined value X in step 506, the operation proceeds to step 507. In step 507, handset controller 418 controls LCD driver 454 to drive liquid crystal device 452. Thereby liquid crystal device 452 is lit by the control of handset controller 418 so that an alarm message, for example, "POWER TURNED OFF SOON. PRESS ANY ONE KEY" is displayed. In this embodiment, since a number of digits for display in display unit 450 is limited to ten digits, sentences or phrases of the alarm messages are properly divided into groups of words and the groups of words are sequentially and continuously displayed on liquid crystal device 452. Also simultaneously a beep tone may be generated via receiver 498 or speaker 492 under control of handset controller 418 and CPU 331. The beep tone may continue as long as the alarm message is displayed or may be generated only at the time that the alarm message is originally displayed. If a user stands by the apparatus and presses any one key thereof, the flag indicative of key operation is set. The setting of the flag will be detected in step 508 discussed below.

After the lighting of display 450, the operation proceeds to step 508. In steps 508–510, handset controller 418 determines whether any key is operated at key unit 430 within a second predetermined period $t_2$. If at least one key is operated, the flag indicative of key operation is set at the register F 418a in handset controller 418. The processor of handset controller 418 checks whether the flag is set or not (step 508). This check is made periodically as mentioned before. In the case that at least one key is operated, handset controller 418 controls LCD driver 454 so that liquid crystal device 452 stops lighting (step 511) and the count value in register A 418c is reset to zero (step 503). After that, the operation proceeds to step 504. On the other hand, if the flag is not set when the flag register is checked the processor 418b of handset controller 418 increments the count value in register A 418c and the operation proceeds to step 510. In step 510, it is determined whether the count value exceeds a second predetermined value Y, which is read from RAM 335 by CPU 331, transmitted via digital interface 340 and line 1002 to handset controller 418, and stored in register C 418e in advance (step 502) or not. If the count value neither exceeds nor equals the second predetermined value, the operation returns to step 508. If the count value exceeds or equals the second predetermined value Y in step 510, the operation proceeds to step 512. In step 512, handset controller 418 sends a signal indicative of automatic power supply termination to radio unit controller 330 by way of line 1002. The signal is input to CPU 331 via digital interface 340. Responsive to this signal, CPU 331 sends a power supply termination signal to power controller 341 control bus 345. Power controller 341 responsive to the termination signal controls power source 390 so that the power supply to respective sections of each unit is cut off. Thereby all the power supply to each unit of this mobile telephone is terminated. It should be noted that a user may easily reset the apparatus from the state in which the power supply is automatically cut off for battery saving by activating switches 474.

Figure 6:
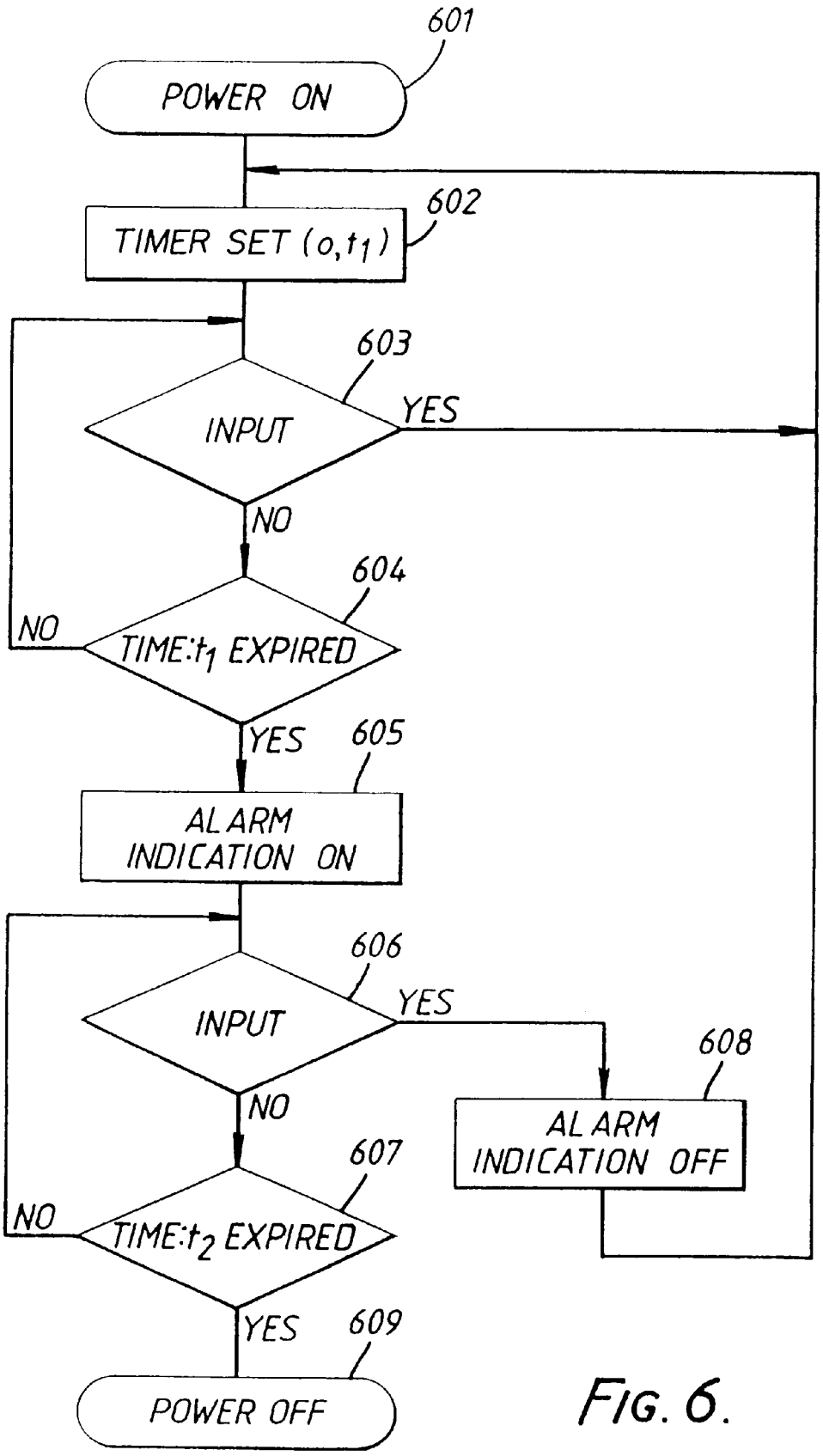
FIG. 6 is a flow chart of and algorithm showing the operation of power supply control according to a second embodiment.

Next the second embodiment of the algorithm for power supply control will be described with reference to FIG. 6.

After on/off switch 474 in main unit 400a is turned on by a user (step 601), CPU 331 in radio unit controller 330 sets an internal timer thereof to zero (step 602). The internal timer is a free running timer clocked in response to a clock pulse signal supplied from oscillator/frequency divider 332. Then, whether any key is operated at key 430 or not is detected by handset controller 418 (step 603). In the case that at least one key is operated at key pad 430, handset controller 418 sends a detection signal to CPU 331 via digital interface 340 connected therewith by way of lines 1002. Responsive to the detection signal, CPU 331 sets the timer again (step 602). In the case that the time, which is measured by the internal timer of CPU 331, exceeds a first predetermined time period $t_1$ without receiving the detection signal (step 604), CPU 331 sends a display command signal to handset controller 418 via digital interface 340. Responsive to the display command signal, handset controller 418 controls display unit 450 so that alarm messages are displayed at liquid crystal device 452. Also, CPU 331 sends a sounding command signal to audio circuit controller 339. Responsive to the sounding command signal, audio circuit controller 339 controls audio circuit 338 so that a pulse signal supplied to audio circuit 337 from oscillator/frequency divider 332 is transmitted to speaker 492 in main unit 400a or receiver 498 in handset 400b by way of lines 1003 for sounding a beep tone. As described above, alarm indications may be both visually and acoustically made (step 605). After the alarm indication is turned on, CPU 331 waits for the detection signal from handset controller 418 again (step 606). Receiving the detection signal, CPU 331 sends stop command signals to handset controller 418 and audio circuit controller 39. Responsive to the stop command signals, handset controller 418 controls display unit 450 to terminate the alarm display. Also, audio circuit controller 339 controls audio circuit 337 so as to terminate the supply of the pulse signal for sounding a beep tone. In the case that the time measured by the internal timer of CPU 331 exceeds a second predetermined time period $t_2$ without receiving the detection signal (step 607), CPU 331 sends a control signal indicative of power supply termination to power supply controller 341 via control bus 345. Responsive to the termination signal, power controller 341 controls power source 390 so that the power supply to respective sections of each unit is cut off (step 609).

In the above mentioned embodiment, while an indication to a user is made by displaying an alarm message or generating a beep tone, a voice message, for example, "PLEASE PRESS ANY ONE KEY, OR POWER WILL BE TURNED OFF SOON" may be artificially synthesized on the basis of prestored data or may be reproduced on the basis of recorded data which have been stored in advance by the user from a speech synthesis unit installed in voice dial/response circuit 350.

Figure 7:
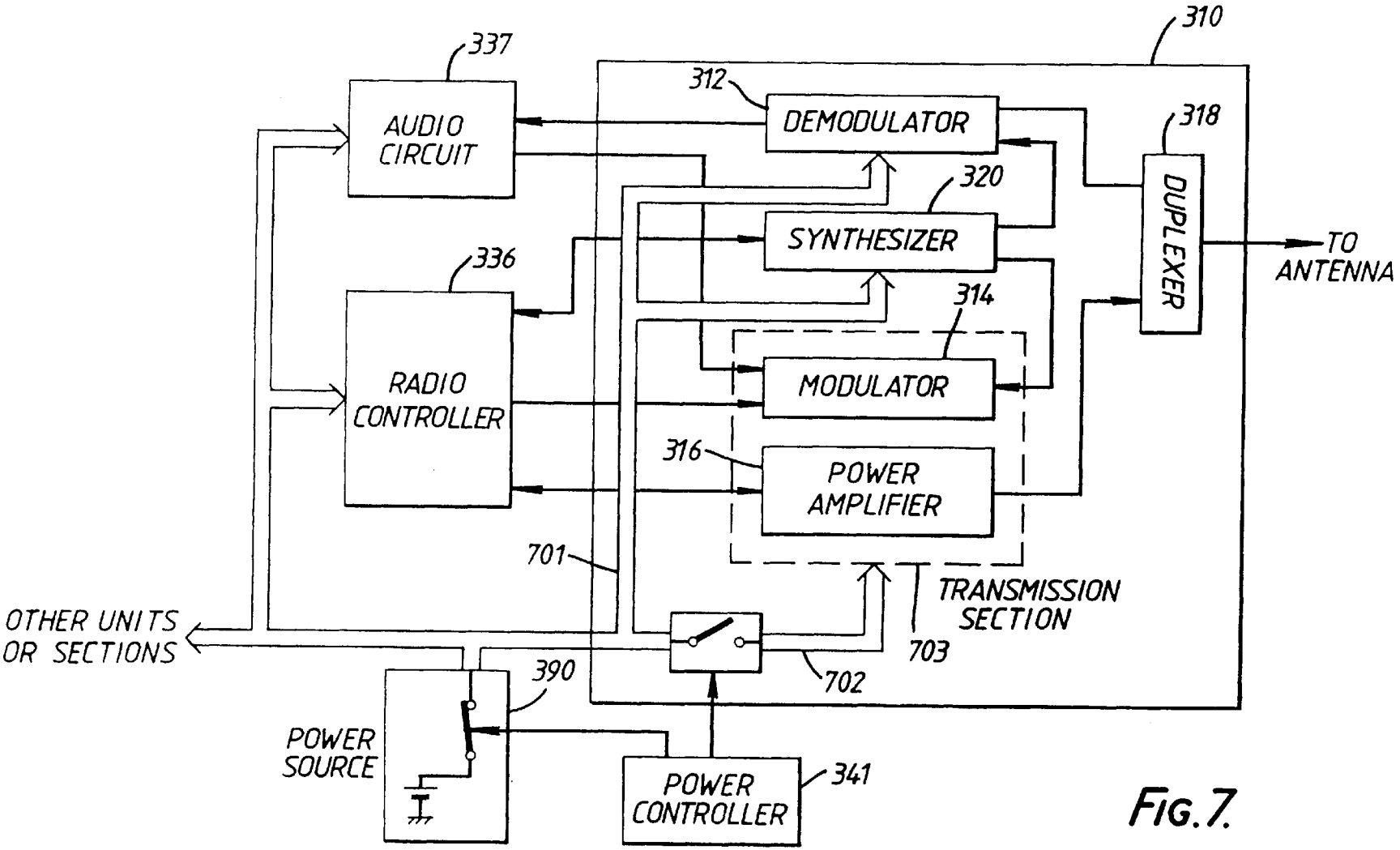
FIG. 7 is a schematic block diagram showing the control of the supply to radio section 310 according to either the algorithm of FIG. 5 or 6.

Furthermore, while power supply to all units of the apparatus is terminated when a certain time period passes in the above-mentioned embodiment, only the power supply to a transmission section for transmitting signals in radio section 310 may be terminated. In this modification of the above described embodiments, the path of power supply for radio section 310 is divided into two paths 701, 702 as shown in FIG. 7. Transmission section 703 including modulator 314 and power amplifier 316 is supplied power by way of path 702 and the other sections in radio section 310 are supplied power by way of path 701. Power controller 341 cuts off only path 702 for transmission section 703 continuing the power supply for the other sections or units in response to the termination signal. According to this modification, when someone is near the apparatus besides an owner, the person may still receive a call from others. Consequently, a user of the apparatus, prevented from making a call for a long time, may only receive a call from others saving the battery power. If a call is received and the user responds to the call by hanging up handset 400b or pressing send key, CPU 331 detects the status and controls power controller 341 so that power supply to transmission section 703 is resumed.

Still further, while the timer is reset in response to the operation of at least one key of key unit 430 in the above mentioned embodiment, it may be further reset in response to the closure of hook switch 472, such as when handset 400b is returned to a carriage (not shown). In the first embodiment, for example, the state when hook switch 472 is closed is detected by audio radio unit controller 330 in radio unit 300 by way of line 1001. Responsive to a detection signal of the on-hook state from radio unit controller 330, handset controller 418 sets the flag indicative of key operation.

Although an embodiment applied to a mobile telephone apparatus has been described, it is apparent to those skilled in this art that this invention may be easily applied to any transportable type radio telephone or handheld type radio telephone that is battery powered. In the case of a transportable type radio telephone, radio unit 300 and antenna 201 are incorporated into a casing of main unit 400a of telephone unit 400, and thereby the telephone unit including radio unit and antenna is capable of being carried by a user. In the case of a handheld type radio telephone or a mobile unit of a cordless telephone, telephone unit 400, radio unit 300, and antenna 201 are combined together in a single casing. The essential features of this invention are applicable to all such cases. Furthermore, the scope of this invention is not limited to the application in a radio telephone capable of being connected to a land-line telephone such as a cellular radio telephone in a cellular radio system but any application of a radio telephone using radio channels falls within the scope of this invention.

Furthermore, this invention may be applicable to an automobile controller controlling input and display unit disposed separately from a main unit of a radio telephone apparatus and any kind of processing unit with the same function as mentioned falls within the scope of this invention.

The first and second predetermined time periods $t_1$ and $t_2$ may be of different durations. It basically depends on the situation. In the case of a mobile telephone, for example, $t_1$ may be appropriately two hours and $t_2$ two hours and three minutes. In portable telephones, for example, $t_1$ may be appropriately one hour and $t_2$, one hour and one minute. It is more important to reduce the battery power consumption in a portable telephone. Also $t_1$ and $t_2$ may be of the same duration. In that case, if a user stands by the apparatus and wishes the apparatus to be operative after the power supply is automatically cut off to save battery power, he has to reactivate the power on/off switch instead of operating any key or a hook switch. Furthermore, a user is able to reset the first and second predetermined time period $t_1$ and $t_2$ for themselves. In the above described embodiment, a user may reset them by performing a certain order of key input at key units 430 as to change the count value of X and Y corresponding to $t_1$ and $t_2$, prestored in RAM 335. For example, to change the count value of X, the user may press keys: FCN, 8, 0, *, 1, 0, *. In this case responsive to the key input of FCN, 8, 0, handset controller 418 recognizes that the user's request of changing the count value X and responsive to the key input of 1, 0 between * and *, handset controller 418 changes the count value X in RAM 335 to a value corresponding to 10 hours.

We claim:

[1. Radio telephone apparatus comprising:

transmitting means for transmitting signals over a first radio channel;

receiving means for receiving signals sent over a second radio channel;

input means responsive to a user's operation for inputting data associated with the operation of said transmitting means and said receiving means;

power supply means for supply said transmitting means and said receiving means with electric power;

signal generating means responsive to any input at said input means for generating a flag signal;

detecting means for detecting the presence or absence of the flag signal at a predetermined interval;

counting means for counting how many times said detecting means detects the absence of the flag signal continuously; and alarming means for alarming at least one user of the apparatus when a count value counted by said counting means exceeds a first predetermined value.]

[2. The apparatus for claim 1 wherein said power supply means terminates power supply at least to said transmitting means when the count value counted by said counting means exceeds a second predetermined value.]

[3. The apparatus of claim 2 wherein the first predetermined value is the same as the second predetermined value.]

[4. The apparatus of claim 2 wherein the second predetermined value is larger than the first predetermined value.]

[5. The apparatus of claim 1 wherein said alarming means comprises means for generating sounds.]

[6. The apparatus of claim 5 wherein the sound generating means comprises speech synthesis means for synthesizing predetermined speech patterns.]

[7. The apparatus of claim 1 wherein the alarming means comprises a visual display unit for displaying at least one alarm message.]

[8. The apparatus of claim 1 wherein said input means comprises a key pad for entering numerical data or command data.]

[9. The apparatus of claim 1 wherein said input means comprises a hook switch for detecting an on-hook or off-hook state.]

[10. The apparatus of claim 1 wherein said first predetermined value is programmable responsive to a certain order of input at said input means.]

[11. The apparatus of claim 2 wherein said second predetermined value is programmable responsive to a certain order of input at said input means.]

[12. Radio telephone apparatus comprising:

transmitting means for transmitting signals over a first radio channel;

receiving means for receiving signals transmitted over a second radio channel;

input means responsive to a user's operation for inputting data associated with the operation of said transmitting means and said receiving means;

control means for controlling said transmitting means and said receiving means in response to the data inputted by said input means;

power supply means for supply said transmitting means, said receiving means, and said control means with electric power;

time measuring means for measuring time passage from the time when any input of said input means is operated lastly; and alarming means for alarming at least one user of the apparatus in response to the time passage measured by said measuring means exceeding a first predetermined time period.]

[13. The apparatus of claim 12 wherein said power supply means terminates power supply at least to said transmitting means when the time passage measured by said measuring means exceeds a second predetermined time period.]

[14. The apparatus of claim 13 wherein the first predetermined time is the same as the second predetermined time.]

[15. The apparatus of claim 13 wherein the second predetermined time period is longer than the first predetermined time period.]

[16. The apparatus of claim 12 wherein said alarming means comprises means for generating sounds.]

[17. The apparatus of claim 16 wherein the sound generating means comprises speech synthesis means for synthesizing predetermined speech patterns.]

[18. The apparatus of claim 12 wherein the alarming means comprises a visual display unit for displaying at least one alarm message.]

[19. The apparatus for claim 12 wherein said input means comprises a key pad for entering numerical data or command data.]

[20. The apparatus of claim 12 wherein said input means comprises a hook switch for detecting an on-hook or off-hook state.]

[21. Radio telephone apparatus comprising transmitting means for transmitting signals over a first radio channel;

receiving means for receiving signals transmitted over a second radio channel;

keyboard input means comprising a plurality of keys responsive to a user's operation for inputting data associated with the operation of said transmitting means and said receiving means;

power supply means for supplying said transmitting means and said receiving means with power;

power supply control means for controlling said power supply means to terminate said power supplied from said power supply means when a predetermined time period passes from the time when any one key of said plurality of keys of said keyboard input means is operated lastly.]

[22. The apparatus of claim 19 wherein power supply control means controls said power supply means so as to terminate power supply at least to said transmitting means.]

[23. A method of terminating power for use in a radio telephone apparatus, comprising the steps of:

setting a count in a memory to zero;

periodically sensing an actuation of a key of the apparatus;

incrementing the count if no actuation of said key is sensed;

determining if the count exceeds a first predetermined number; and alarming a user of the apparatus if the count exceeds the first predetermined number.]

[24. The method of claim 23 further comprises the steps of determining if the count exceeds a second predetermined number and terminating power supply at least to a transmitter if the count exceeds the second predetermined number.]

[25. A method of terminating power for use in a radio telephone apparatus, comprising the steps of:

sensing an actuation of a key of the apparatus;

starting the measurement of time each time the actuation of a key is sensed;

determining if the measured time exceeds a first predetermined time period;

alarming a user of the apparatus if the measured time exceeds the first predetermined time period.]

[26. The method of claim 25 further comprises the steps of determining if the measured time exceeds a second predetermined time period and terminating power supply at least to a transmitter if the measured time exceeds the second predetermined time period.]

[27. Power terminating apparatus for use with a radio telephone apparatus comprising:

input means responsive to a user's operation for inputting data associated with the operation of said radio telephone apparatus;

time measuring means for measuring time passage from the time when said input means is operated lastly;

control means for generating an alarm signal in response to the time passage measured by said time measuring means exceeding a first predetermined time period; and indicating means responsive to said alarm signal for indicating the termination of power supply to said radio telephone apparatus.]

[28. The apparatus of claim 27 wherein said control means further generates a power terminating signal for terminating power supply to said radio telephone apparatus in response to the time passage measured by said measuring means exceeding a second predetermined time period.]

[29. The apparatus of claim 27 wherein said alarming means comprises means for generating sounds.]

[30. The apparatus of claim 29 wherein the sound generating means comprises speech synthesis means for synthesizing predetermined speech patterns.]

[31. The apparatus of claim 27 wherein said alarming means comprises a visual display means for displaying at least one alarm message.]

[32. Radio telephone apparatus comprising:

transmitting means for transmitting signals over at least one radio channel;

receiving means for receiving signals sent over at least one radio channel;

input means responsive to user's operation for inputting data associated with the operation of said transmitting means and said receiving means;

power supply means for supplying said transmitting means and said receiving means with electric power;

signal generating means responsive to any input at said input means for generating a flag signal;

detecting means for detecting the presence or absence of said flag signal at a predetermined interval;

counting means for counting how many times said detecting means detects the absence of said flag signal continuously; and control means coupled to said counting means for controlling said power supply means so that said power supplied to at least said transmitting means is terminated when a count value counted by said counting means exceeds a first predetermined value.]

[33. The apparatus of claim 32 further comprising alerting means for alerting a user of the apparatus when the count value counted by said counting means exceeds a second predetermined value.]

[34. The apparatus of claim 33 wherein the first predetermined value is the same as the second predetermined value.]

[35. The apparatus of claim 33 wherein the first predetermined value is larger than the second predetermined value.]

[36. The apparatus of claim 33 wherein said alerting means comprises means for generating sounds.]

[37. The apparatus of claim 36 wherein the sound generating means comprises speech synthesis means for synthesizing predetermined speech patterns.]

[38. The apparatus of claim 33 wherein the alerting means comprises a visual display unit for displaying at least one alarm message.]

[39. The apparatus of claim 32 wherein said input means comprises a key pad for entering numerical data or command data.]

[40. The apparatus of claim 32 wherein said input means comprises a hook switch for detecting an on-hook or off-hook state.]

[41. The apparatus of claim 32 wherein said first predetermined value is programmably responsive to a certain order of input at said input means.]

[42. The apparatus of claim 33 wherein said second predetermined value is programmably responsive to a certain order of input at said input means.]

[43. Radio telephone apparatus comprising:

transmitting means for transmitting signals over at least one radio channel;

receiving means for receiving signals transmitted over at least one radio channel;

input means responsive to the user's operation for inputting data associated with the operation of said transmitting means and said receiving means;

control means for controlling said transmitting means and said receiving means in response to the data input by said input means;

power supply means for supplying said transmitting means, said receiving means, and said control means with electric power;

time measuring means for measuring time passage form the time when any input of said input means is operated lastly; and power supply control means coupled to said time measuring means for controlling said power supply means so that power supply is terminated to at least said transmitting means in response to the time passage measured by said measuring means exceeding a first predetermined time period.]

[44. The apparatus of claim 43 further comprising alerting means for alerting a user of the apparatus when the time passage measured by said measuring means exceeds a second predetermined time period.]

[45. The apparatus of claim 44 wherein the first predetermined time is the same as the second predetermined time.]

[46. The apparatus of claim 44 wherein the first predetermined time period is longer than the second predetermined time period.]

[47. The apparatus of claim 44 wherein said alarming means comprises means for generating sounds.]

[48. The apparatus of claim 47 wherein the sound generating means comprises speech synthesis means for synthesizing predetermined speech patterns.]

[49. The apparatus of claim 44 wherein the alerting means comprises a visual display unit for displaying at least one alarm message.]

[50. The apparatus of claim 43 wherein said input means comprises a key pad for entering numerical data or command data.]

[51. The apparatus of claim 43 wherein said input means comprises a hook switch for detecting an on-hook or off-hook state.]

[52. A method of terminating power for use in a radio telephone apparatus with a transmitter, comprising the steps of:

setting a count in a memory to zero;

periodically sensing an actuation of any input key of a plurality of input keys of the apparatus;

incrementing the count if no actuation of any input key is sensed;

determining if said count exceeds a first predetermined number; and terminating power supply at least to the transmitter if said count exceeds said first predetermined number.]

[53. The method claim of claim 52 further comprising the steps or determining if the count exceeds a second predetermined number and alerting a user of the apparatus if the count exceeds the second predetermined number.]

[54. A method of terminating power for use in a radio telephone apparatus with a transmitter, comprising the steps of:

sensing an actuation of any input key of a plurality of input keys of the apparatus;

starting the measurement of time each time said actuation of a key is sensed;

determining if the measured time exceeds a first predetermined time period;

terminating power supply at least to a transmitter if the measured time exceeds said first predetermined time period.]

[55. The method of claim 54 further comprising the steps of determining if the measured time exceeds a second predetermined time period and alerting a user of the apparatus if the measured time exceeds said second predetermined time period.]

*56. Radio telephone apparatus comprising:*

*transmitting means for transmitting signals;*

*receiving means for receiving signals;*

*key input means for inputting a first predetermined count value corresponding to a first predetermined time period;*

*power supply means for supply the transmitting means and the receiving means with power;*

*counting means for counting passage of time; and,*

*power supply control means for controlling the power supply means so as to terminate power to at least of the transmitting means and the receiving means when the passage of time counted by the counting means exceeds the first predetermined time period, the termination of power supply being postponed if a user's operation is performed within the first predetermined time period.*

*57. The apparatus of claim 56 further comprising alerting means for alerting a user of the apparatus, and wherein the key input means is also for inputting a second predetermined count value corresponding to a second predetermined time period, and the alerting means alerts the user when the passage of time counted by the counting means exceeds the second predetermined time period.*

*58. Radio telephone apparatus comprising:*

*a transmitter for transmitting signals;*

*a receiver for receiving signals;*

*key input means having keys responsive to a user's actuation for inputting a command data associated with the operation of at least one of the transmitter and the receiver and for inputting a first predetermined count value corresponding to a first predetermined time period;*

*a power supply for supplying the transmitter and the receiver with electric power;*

*a counter for counting passage of time from the time when an operation responsive to the user's actuation of the key input means is performed; and,*

*a power supply controller for controller for controlling the power supply to terminate electric power to at least one of the transmitter and the receiver when the passage of time counted by the counter exceeds the first predetermined time period.*

*59. The apparatus of claim 58 further comprising alerting means for alerting a user of the apparatus and wherein the key input means is also for inputting a second predetermined time period and the alerting means alerts the user when the passage of time counted by the counter exceeds the second predetermined time period.*

*60. A radio telephone apparatus for communicating over a radio link comprising:*

*transmitting means for transmitting signals over the radio link;*

*receiving means for receiving signals transmitted over the radio link;*

*switch means responsive to a user's operation for terminating the radio link;*

*key input means for inputting a count value corresponding to a first predetermined time period;*

*counting means for counting passage of time from a time when the switch means is operated lastly;*

*power supply means for supplying the transmitting means and the receiving means with power; and,*

*power supply control means for controlling the power supply means so as to terminate power supply to at least one of the transmitting means and the receiving means from the power supply means when the passage of time counted by the counting means exceeds the first predetermined time period.*

*61. The apparatus of claim 60 wherein the switch means is a hook switch.*

*62. A method of terminating power for use in a radio telephone apparatus with a transmitter and an input means comprising keys, the method comprising the steps of:*

*setting a first count value corresponding to a first predetermined time period by operating the input means;*

*sensing an actuation of any key of the input means associated with the operation of the transmitter;*

*starting the count of time when each actuation of any of the input keys is sensed;*

*determining if the counted time exceeds the first predetermined time period; and*

*terminating power supply to at least the transmitter if the counted time exceeds the first predetermined time period.*

*63. The method of claim 62 further comprising the steps of:*

*setting a second count value corresponding to a second predetermined time period;*

*determining if the counted time exceeds the second predetermined time period; and*

*alerting a user of the apparatus if the counted time exceeds the second predetermined time period.*

*64. The apparatus of claim 56 wherein the key input means has numeral keys and function keys.*

*65. The apparatus of claim 58 wherein the key input means has numeral keys and function keys.*

*66. The apparatus of claim 57 wherein the first predetermined time period and the second predetermined time period have different values.*

*67. The apparatus of claim 59 wherein the first predetermined time period and the second predetermined time period have different values.*

*68. The method of claim 63 wherein the first predetermined time period and the second predetermined time period have different values.*

*69. A radio telephone apparatus comprising:*

*a transmitter for transmitting signals;*

*a receiver for receiving signals;*

*a switch;*

*power supply means, responsive to actuation of said switch, for supplying power to said transmitter and said receiver;*

*time measuring means for measuring time passage when said switch is actuated;*

*periodic sensing means for periodically sensing actuation of one of a plurality of key inputs;*

*power supply controller for controlling said power supply means to terminate power supplied to at least one of said transmitter and said receiver when said sensing means fails to sense actuation of one of the plurality of key inputs and the time passage exceeds a predetermined time period.*

*70. The radio telephone apparatus according to claim 69 wherein when said sensing means senses actuation of one of the plurality of key inputs prior to the time passage exceeding the predetermined time period, said time measuring means restarts measuring time passage.*

*71. Power terminating apparatus for use with a radio telephone comprising:*

*a switch;*

*power supply means, responsive to actuation of said switch, for supplying power to said radiotelephone apparatus;*

*time measuring means for measuring time passage when said switch is actuated;*

*periodic sensing means for periodically sensing actuation of one of a plurality of key inputs; and*

*power supply controller for controlling said power supply means to terminate power supplied to at least a portion of said radiotelephone apparatus when said sensing means fails to sense actuation of one of the plurality of key inputs and the time passage exceeds a predetermined time period.*

*72. The power terminating apparatus according to claim 71 wherein when said sensing means senses actuation of one of the plurality of key inputs prior to the time passage exceeding the predetermined time period, said time measuring means restarts measuring time passage.*

*73. Radio telephone apparatus comprising;*

*transmitting means for transmitting signals;*

*receiving means for receiving signals;*

*setting means for setting a predetermined count value corresponding to a predetermined time period;*

*memory means coupled to said setting means for storing the predetermined count value set by said setting means;*

*power supply means for supplying said transmitting means and said receiving means with electric power;*

*counting means for counting passage of time;*

*power supply control means for controlling said power supply means so as to terminate power supply to at least one of said transmitting means and said receiving means when a count value counted by said counting means exceeds the predetermined count value; and*

*wherein said setting means comprises a plurality of keys and the passage of time counted by said counting means is reset when any of said keys of said setting means is operated.*

*74. The apparatus of claim 73 wherein the passage of time counted by said counting means is reset to zero when a switch for terminating an established radio link is operated.*

*75. The apparatus of claim 73 wherein said setting means has numeral keys and function keys.*

* * * * *

UNITED STATES PATENT AND TRADEMARK OFFICE

CERTIFICATE OF CORRECTION

PATENT NO.: RE 36,712

DATED: May 23, 2000

INVENTORS: Hiroshi SATO, *et al.*

It is certified that an error appears in the above-identified patent and that said Letters Patent is hereby corrected as shown below:

On the cover page, in [63] Related U.S. Patent Documents,
"Jun. 10, 1990" has been replaced with --July 28, 1994--.

In Claim 59, column 15, line 46, after "least" --one-- has been inserted.

Signed and Sealed this

Third Day of April, 2001

*Attest:*

Nicholas P. Godici

NICHOLAS P. GODICI

*Attesting Officer*

*Acting Director of the United States Patent and Trademark Office*